(12) United States Patent
Lu (10) Patent No.: US 11,966,685 B1
(45) Date of Patent: Apr. 23, 2024

(54) WEBPAGE EDITION SYSTEM AND METHOD THEREOF

(71) Applicant: Ying Zhang Lu, New Taipei (TW)

(72) Inventor: Ying Zhang Lu, New Taipei (TW)

( * ) Notice: Subject to any disclaimer, the term of this patent is extended or adjusted under 35 U.S.C. 154(b) by 0 days.

(21) Appl. No.: 18/130,576

(22) Filed: Apr. 4, 2023

(30) Foreign Application Priority Data

Feb. 24, 2023 (TW) .................. 112107103

(51) Int. Cl.
*G06F 40/151* (2020.01)

(52) U.S. Cl.
CPC .................. *G06F 40/151* (2020.01)

(58) Field of Classification Search
CPC .................................................. G06F 40/151
See application file for complete search history.

(56) References Cited

U.S. PATENT DOCUMENTS

| | | | | |
|---|---|---|---|---|
| 6,178,433 B1* | 1/2001 | Nakamura | ......... | G06F 16/9577 707/E17.121 |
| 6,182,092 B1* | 1/2001 | Francis | ......... | G06F 40/143 715/234 |
| 6,964,017 B1* | 11/2005 | Meisner | ......... | G06F 40/143 715/205 |
| 7,207,000 B1* | 4/2007 | Shen | ......... | G06F 40/154 707/999.01 |
| 7,213,202 B1* | 5/2007 | Kagle | ......... | G06F 40/151 715/235 |
| 9,026,903 B1* | 5/2015 | Michael | ......... | G06F 40/154 715/235 |
| 11,443,098 B1* | 9/2022 | Goel | ......... | G06F 40/106 |
| 2004/0073708 A1* | 4/2004 | Warnock | ......... | G06F 40/143 707/E17.118 |
| 2004/0205488 A1* | 10/2004 | Fry | ......... | G06F 40/117 715/201 |
| 2013/0346851 A1* | 12/2013 | Leece | ......... | G06F 16/9577 715/234 |
| 2018/0210714 A1* | 7/2018 | Grigoryan | ......... | H04L 67/02 |
| 2018/0232340 A1* | 8/2018 | Lee | ......... | G06F 40/186 |
| 2021/0350064 A1* | 11/2021 | Freundlich | ......... | G06Q 10/1053 |
| 2022/0129619 A1* | 4/2022 | Vong | ......... | G06T 11/203 |
| 2022/0366131 A1* | 11/2022 | Ekron | ......... | G06F 16/986 |

FOREIGN PATENT DOCUMENTS

| | | | | | |
|---|---|---|---|---|---|
| JP | 2002526862 | A | * | 8/2002 | |
| KR | 100279751 | B1 | * | 2/2001 | |
| TW | 201037530 | A | * | 10/2010 | ....... G06F 17/30905 |
| WO | WO-0020985 | A1 | * | 4/2000 | ......... G06F 17/2229 |

* cited by examiner

*Primary Examiner* — Shahid K Khan
(74) *Attorney, Agent, or Firm* — Birch, Stewart, Kolasch & Birch, LLP (57) ABSTRACT

The present invention discloses a webpage edition system and a method thereof. The webpage edition system comprises an edition unit and a transform unit. The transform unit includes a plurality of syntax transform modules. Each syntax transform module is corresponding to a webpage edition instruction. A portion of each webpage edition instruction is defined by a natural language-based syntactic structure. The edition unit uses one or a combination of more than two of the plurality of webpage edition instructions to form a webpage edition instruction set. While executing the webpage edition instruction set, the edition unit takes the corresponding syntax transform module from the transform unit to convert each webpage edition instruction set into a webpage element.

6 Claims, 8 Drawing Sheets

```
_initialize = _ => {            function _establish a button
_establish button               (button name, class, nobody){
("draw circle")                   const new button= _generate
._coordinates (50,              input element.call(this,'button',
50)                             nobody);
._click (_ => {                   new button._text (button
_circle (300, 200,              name);
150)                              if(class){
  })                                new button._new class
}                               ('ninja_button'+class);
                                  }else{
                                    new button._new class
                                ('ninja_button0');
                                  }
                                  new button._font
                                size=function(fontsize){/*
                                adjust button width according
                                to number of words */
                                    new button.style['font-size']
                                = fontsize + 'px';
                                    const number of half-size
                                words = _number of words
                                ( button name )
                                    new button.style['width'] =
                                (parseInt(fontsize)/2*(number
                                of words+2));
                                    return new button;
                                  };
```

Fig.4

```
_initialize = _ => {           element._coordinates=function(xx,
  _establish                   yy){
  button("draw circle")          if(xx||xx==0){
  ._coordinates (50, 50)           if(xx>=0){
  ._click(_ => {                     element.style.left = xx+"px";
    _circle(300, 200, 150)           element.style.right = 'auto';
  })                               }else{
}                                    element.style.left = 'auto';
                                     element.style.right = -
                               xx+"px";
                                   }
                                 if(yy||yy==0){
                                   if(yy>=0){
                                     element.style.top =
                               yy+"px";
                                     element.style.bottom =
                               'auto';
                                   }else{
                                     element.style.top = 'auto';
                                     element.style.bottom = -
                               yy+"px";
                                   }
                                 }
```

Fig.5

```
_initialize = _ => {          element._click= function(callback,
_establish                    pause, ...args){
button("draw                     if(callback && typeof callback ===
circle")                      "function"){
._coordinates (50,                  element.addEventListener('click',
50)                           function(){
._click (_ => {                        element.disabled = true;
_circle (300, 200,                     const pause for ms= pause?
150)                          pause: 2000;
  })
}                             setTimeout(()=>{ element.disabled =
                              false; }, pause for ms);
                                       callback(...args);
                                    });
                                 }else{
                                    element.click(...args);
                                 }
                                 return element;
                              }
```

```
_initialize=_=>{                    <html>
  header =                          <head>
[ "month", "deposit"]               <style>
  contents =                        table, th, td {
[[ "January","$100"],                border: 1px solid black;
[ "February","$80"]]                }
  _establish table                  table.center {
(contents,                           margin-left: auto;
header)._center ()                   margin-right: auto;
}                                   }
                                    </style>
                                    </head>
                                    <body>

<table class="center">
                                     <tr>
                                       <th>month</th>
                                       <th>deposit</th>
                                     </tr>
                                     <tr>
                                       <td>January </td>
                                       <td>$100</td>
                                     </tr>
                                     <tr>
                                       <td>February</td>
                                       <td>$80</td>
                                     </tr>
                                    </table>

</body>
                                    </html>
```

Fig.8

| | |
|---|---|
| _initialize = _ => {<br>  header =<br>[ "name", "email", "phone"]<br>  contents = [[ "John"<br>       ,"john.doe@example.com"<br>       ,"0919-123456"<br>       ,"0919-123678"]]<br>  table 1 = _establish table (contents, header, [1,1,2])<br>    ._headline( "deposit per month")<br>    ._click (table 1 change color)<br><br>  contents = [[ "John"]<br>       ,["john.doe@example.com"]<br>       ,["0919-123456"]<br>       ,["0919-123678"]]<br>  _establish rightward table(contents, header, [1,1,2])<br>    ._headline ( "deposit per month")<br>    ._position (1,400)<br>}<br><br>Table 1 change color= _ => {<br>  Table 1._background color ('#BBBB11')<br>} | `<html>`<br>`<head>`<br>`<style>`<br>`table, th, td {`<br>`  border: 1px solid black;`<br>`}`<br>`</style>`<br>`<script>`<br>`function myFunction() {`<br>`  document.getElementById("demo")`<br>`    .style['background-color'] = "#BBBB11";`<br>`}`<br>`</script>`<br>`</head>`<br>`<body>`<br>`<table id="demo" onclick="myFunction()">`<br>`  <tr>`<br>`    <th> name </th>`<br>`    <th> email </th>`<br>`    <th colspan="2">phone</th>`<br>`  </tr>`<br>`  <tr>`<br>`    <td>John</td>`<br>`    <td>john.doe@example.com</td>`<br>`    <td>0919-123456</td>`<br>`    <td>0919-123678</td>`<br>`  </tr>`<br>`</table>`<br>`<table>`<br>`  <tr>`<br>`    <th> name:</th>`<br>`    <td> john </td>`<br>`  </tr>`<br>`  <tr>`<br>`    <th> email</th>`<br>`    <td>john.doe@example.com</td>`<br>`  </tr>`<br>`  <tr>`<br>`    <th rowspan="2"> phone:</th>`<br>`    <td>0919-123456</td>`<br>`  </tr>`<br>`  <tr>`<br>`    <td>0919-123678</td>`<br>`  </tr>`<br>`</table>`<br>`</body>`<br>`</html>` |

Fig.9

WEBPAGE EDITION SYSTEM AND METHOD THEREOF

This application claims priority for TW patent application no. 112107103 filed on 24 Feb. 2023, the content of which is incorporated by reference in its entirely.

BACKGROUND OF THE INVENTION

Field of the Invention

The present invention relates to an edition system and method therefor, particularly to a webpage edition system and method using a natural language-based syntactic structure.

Description of the Prior Art

The current mainstream program code used by webpage programmers to edit webpages is based on the HyperText Markup Language (HTML). Because of prosperous development of webpage generation technology, pictures and objects are embedded in webpages to provide diversified appearances for webpages. Merely in the HTML architecture, there have been a Cascading Style Sheets (CSS)-based program code to define the appearance and layout of text and other elements and a JavaScript-based program code to influence the behaviors of editing webpages, such as embedding dynamic text into an HTML webpages, reviewing the browser information about visitors, and responding to browser events.

Because the presentation of webpages is renewed frequently and the contents of webpages need updating often, the webpage programmers have to edit or amend the program codes of the webpages using different programming languages. After the source code of the webpage has been edited or amended many times, the webpage program code will become more and more confusing. Besides, much difference exists among different program codes and natural languages. In such a situation, the webpage programmers are hard to find the program code sections needing amendment or even hard to grasp the webpage content corresponding to the program code.

Owing to the abovementioned problems, the method of producing webpages should be improved to make the webpage programmers able to fast find the program code sections they want to edit/amend and overcome the edition difficulties caused by problem that the webpage program code becomes more and more confusing after it has been edited many times.

SUMMARY OF THE INVENTION

Considering the problems of the prior art, an objective of the present invention is to make the webpage edition method more resemble the structure of the natural languages of human beings, wherein the program code having the reduced number of bits is used to realize various elements of webpages, whereby the webpages may be edited or amended more easily later.

In order to achieve the objective of the present invention, the present invention provides a webpage edition system, which comprises a transform unit and an edition unit. The transform unit includes a plurality of syntax transform modules. Each syntax transform module is corresponding to a webpage edition instruction. A portion of each webpage edition instruction is defined by a natural language-based syntactic structure. The edition unit uses one of the plurality of webpage edition instructions or a combination of more than two of the plurality of webpage edition instructions to form a webpage edition instruction set. While the edition unit is executing the webpage edition instruction set, the edition unit takes the corresponding syntax transform module from the transform unit to convert each webpage edition instruction set into a webpage element.

In some embodiments, the webpage element is realized by one of an HTML-based program code, a CSS-based program code, and a JavaScript-based program code, or a combination of more than two of an HTML-based program code, a CSS-based program code, and a JavaScript-based program code.

In some embodiments, each webpage edition instruction includes one of a function instruction part and a content description part, or a combination thereof. The function instruction part is edited with a natural language-based syntactic structure. The content description part contains a parameter, a variable, a value, or a combination of more than two of them.

In some embodiments, the function instruction part of each webpage edition instruction is corresponding to one of the plurality of syntax transform modules. While the edition unit is executing the webpage edition instruction set, the edition unit uses the content of the function instruction part to acquire the corresponding syntax transform module in the transform unit. The content of the content description part of each webpage edition instruction includes a parameter, a variable, a value, or a combination of more than two of them, which the function instruction part of the webpage edition instruction will apply to the corresponding syntax transform module.

In some embodiments, each syntax transform module is program codes edited in a programming language in advance according to the conversion relationship of each webpage edition instruction being converted into a webpage element.

In some embodiments, the programming language is the Java programming language, the JavaScript programming language, the C programming language, the Rust programming language, the Go programming language, the WebAssembly programming language, the Python programming language, the Ruby programming language, the PHP programming language, or the C++ programming language.

In some embodiments, the transform unit and the edition unit are edited in a programming language to form a transform application program, and the transform unit is edited in the transform application program according to the conversion relationship. The transform application program includes a plurality of transform functions. Each of the transform functions is corresponding to the one of the plurality of syntax transform modules. While the transform application program executes each of the webpage edition instructions, the transform application program uses one of the plurality of transform functions or a combination of more than two of the plurality of transform functions to generate the webpage element.

In some embodiments, the webpage edition system comprises a local function library established for storing a plurality of transform functions. Alternatively, the webpage edition system is connected with a far-end function library established in a far-end data server for storing a plurality of transform functions.

In order to achieve the objective of the present invention, the present invention also provides a webpage edition method, which is applied to a webpage edition system. The webpage edition system comprises an edition unit and a transform unit. The transform unit includes a plurality of syntax transform modules. Each syntax transform module is corresponding to a webpage edition instruction. Each webpage edition instruction includes at least one a function instruction part and a content description part. The function instruction part is defined by a natural language-based syntactic structure. The webpage edition method comprises steps: the edition unit receives a webpage edition instruction set, wherein the webpage edition instruction set is edited with one or more webpage edition instructions; the edition unit executes the webpage edition instruction set, wherein the edition unit analyzes the function instruction part and the content description part of each webpage edition instruction of the webpage edition instruction set; the edition unit acquires the syntax transform module in the transform unit, which is corresponding to each function instruction part, according to the order of the webpage edition instructions; and the edition unit applies the content description part of each webpage edition instruction to the corresponding syntax transform module to output a webpage element.

In some embodiments, each syntax transform module is program codes edited in a programming language in advance according to the conversion relationship of each webpage edition instruction being converted into a webpage element.

The present invention enables users to edit webpage contents in a syntactic structure close to natural language, whereby webpage engineers can easily find the program code needing amendment. Even though the program code of the webpage has been amended many times, the program code still remains concise and easily understood.

DETAILED DESCRIPTION OF THE INVENTION

The embodiments of the present invention will be further demonstrated in details hereinafter in cooperation with the corresponding drawings. In the drawings and the specification, the same numerals represent the same or the like elements as much as possible. For simplicity and convenient labelling, the shapes and thicknesses of the elements may be exaggerated in the drawings. It is easily understood: the elements belonging to the conventional technologies and well known by the persons skilled in the art may be not particularly depicted in the drawings or described in the specification. Various modifications and variations made by the persons skilled in the art according to the contents of the present invention are to be included by the scope of the present invention.

Figure 1:
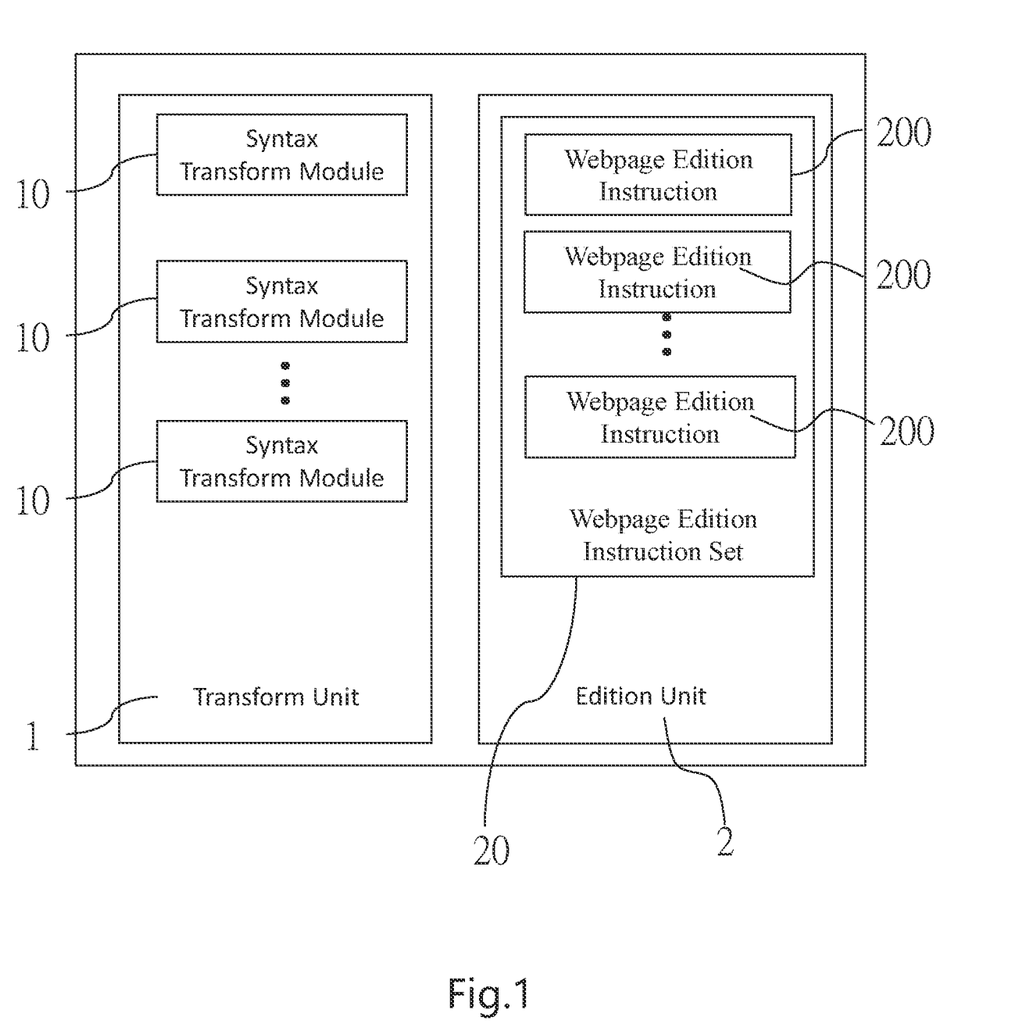
FIG. 1 is a diagram schematically showing a webpage edition system according to one embodiment of the present invention.

Refer to FIG. 1. The present invention proposes a webpage edition system, which comprises a transform unit 1 and an edition unit 2. The transform unit 1 includes a plurality of syntax transform modules 10. Each syntax transform module 10 is corresponding to a webpage edition instruction 200. A portion of each webpage edition instruction 200 is defined by a natural language-based syntactic structure. The edition unit 2 uses one of the plurality of webpage edition instructions 200 or a combination of more than two of the plurality of webpage edition instructions 200 to form a webpage edition instruction set 20. While the edition unit 2 is executing one webpage edition instruction set 20, the edition unit 2 takes the corresponding syntax transform module 10 from the transform unit to convert the webpage edition instruction set 20 into a webpage element.

In some embodiments, each syntax transform module 10 is program codes edited in a programming language in advance according to the conversion relationship of each webpage edition instruction 200 being converted into a webpage element.

In some embodiments, in order to execute each webpage edition instruction 200, the transform unit 1 is edited in the JavaScript programming language according to the conversion relationship to form a transform application program. The transform application program includes a plurality of transform functions. Each transform function is corresponding to one of the syntax transform modules 10. While executing each webpage edition instruction 200, the transform application program uses one of the transform functions or a combination of more than two of the transform functions to generate the program code based on one or more than two of HTML, CSS, and JavaScript. Thus, the webpage browser executes the program code based on one or more than two of HTML, CSS, and JavaScript and presents the corresponding webpage elements on the webpage browser. However, the present invention is not limited by the above-mentioned programming languages. In the present invention, the transform application program may also generate the program code based on the Java programming language, the C programming language, the Rust programming language, the Go programming language, the WebAssembly programming language, the Python programming language, the Ruby programming language, the PHP programming language, or the C++ programming language.

In the present invention, each webpage edition instruction 200 includes one of a function instruction part and a content description part, or a combination thereof. The function instruction part is edited with a natural language-based syntactic structure. The content description part contains a parameter, a variable, a value, or a combination of more than two of them.

Figure 2:
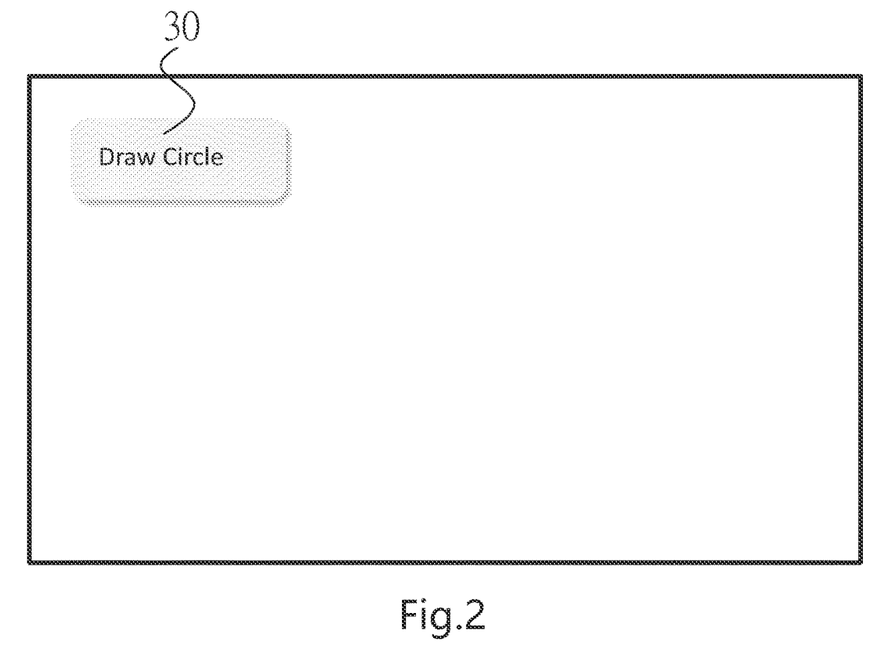
FIG. 2 is a diagram schematically showing a "draw circle" button on a webpage.
Figure 3:
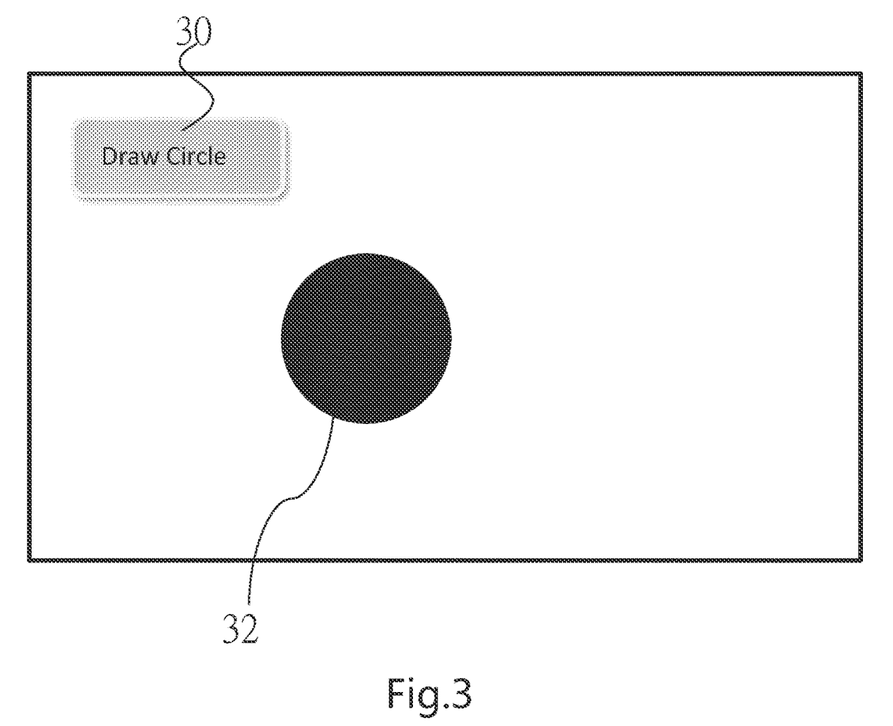
FIG. 3 is a diagram schematically showing a solid circle presented on a webpage after the "draw circle" button on FIG. 2 is pressed.

For example, a webpage element of a button icon 30 (as shown in FIG. 2) for drawing a circle is intended to be shown on an intersection of a line vertically passing the fiftieth pixel in the X axis and a line vertically passing the fiftieth pixel in the Y axis; pressing the button icon 30 makes a solid circle 32 having a radius of 500 pixels (shown in FIG. 3) appear at an intersection of a line vertically passing the three-hundredth pixel in the X axis and a line vertically passing the two-hundredth pixel in the Y axis. The webpage edition instruction set 20 edited by the edition unit 2 is shown in a Table below.

| Serial number | Webpage edition instruction 200 |
|---|---|
| 1 | _initialize = _=> { |
| 2 | _establish button ("draw circle") |
| 3 | ._coordinates (50, 50) |
| 4 | ._click (_ => { |
| 5 | ._circle (300, 200, 150) |
| 6 | }) |
| 7 | |

In the table showing the webpage edition instruction set 20, "initialize", "coordinates", "click", and "circle" are the portions defined by a natural language-based syntactic structure in the No. 1-No. 5 webpage edition instructions 200. "_" or "._" is a syntax the transform application program learns from a forwarding function of the JavaScript programming language. The function instruction part of the webpage edition instruction 200 is formed by combining "_" or "._" with a natural language-based syntactic structure. "=_=>{" or "_=>{" are also syntaxes the transform application program learns from a forwarding function of the JavaScript programming language, together with the parameter, variable or value, such as ""draw circle"", "(50, 50)" and "(300, 200, 150)", to form the content description part.

Figure 4:
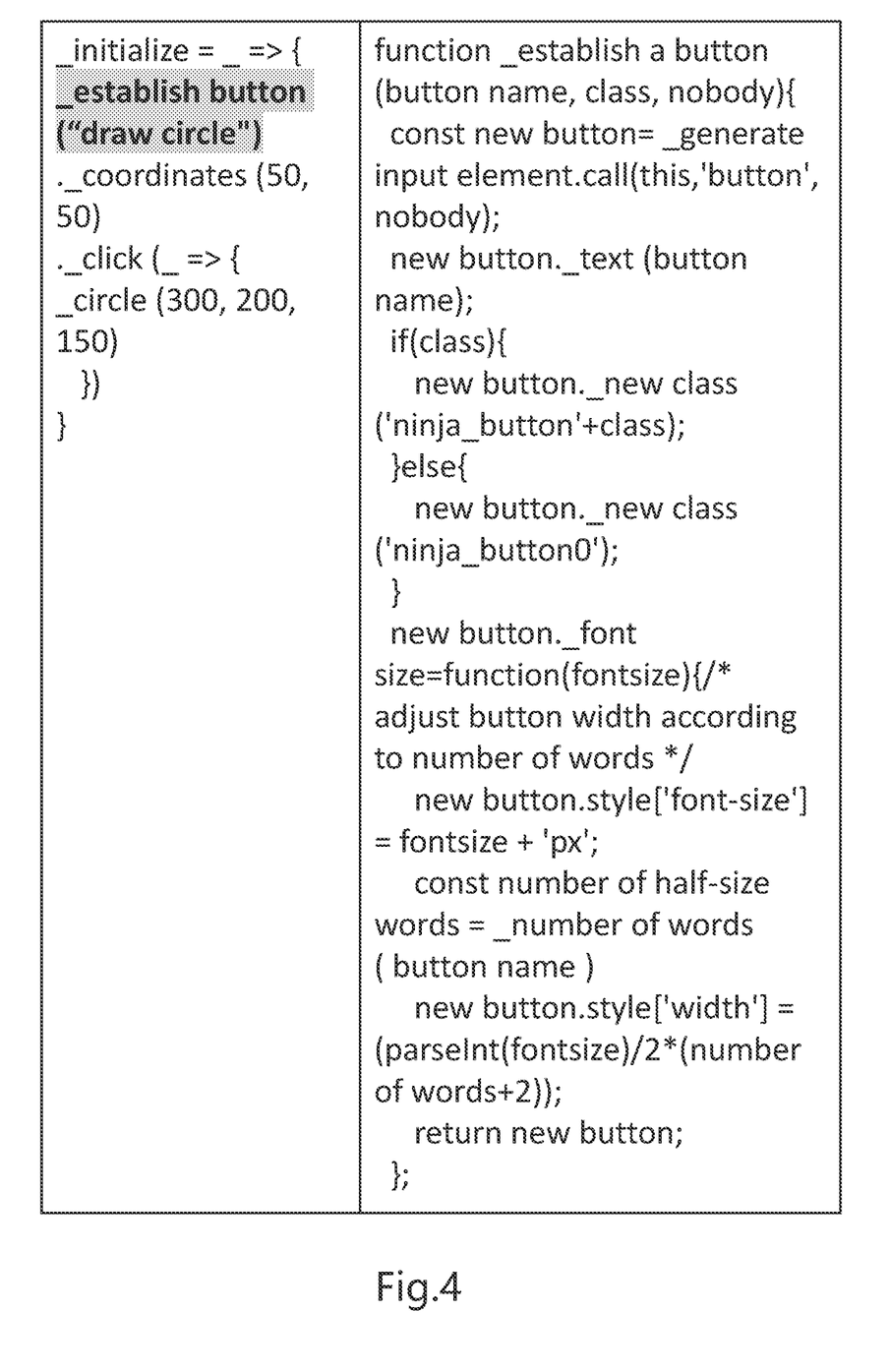
FIG. 4 shows the correlation of a webpage edition instruction set and transform functions according to one embodiment of the present invention.
Figure 5:
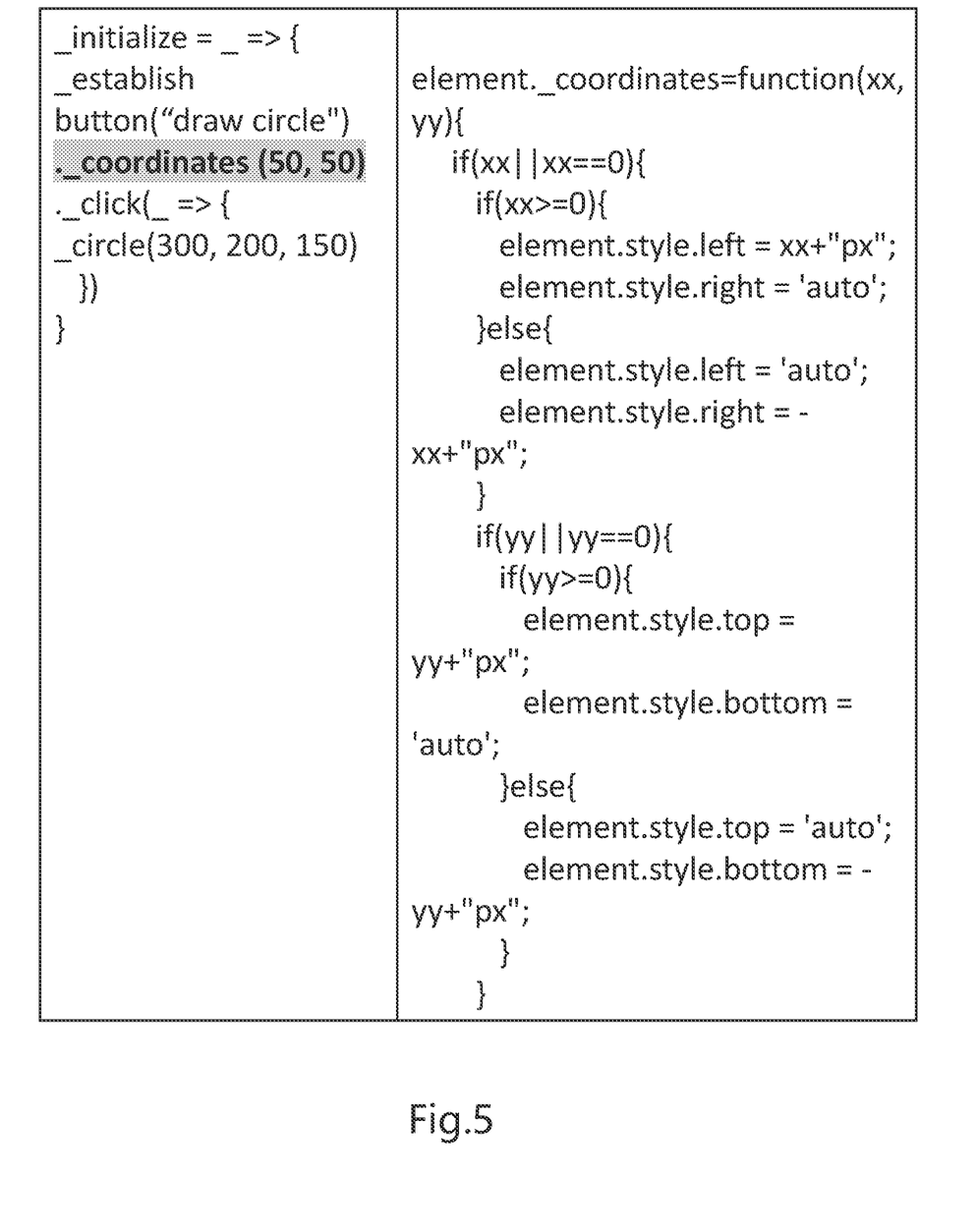
FIG. 5 shows the correlation of a webpage edition instruction set and transform functions according to another embodiment of the present invention.
Figure 6:
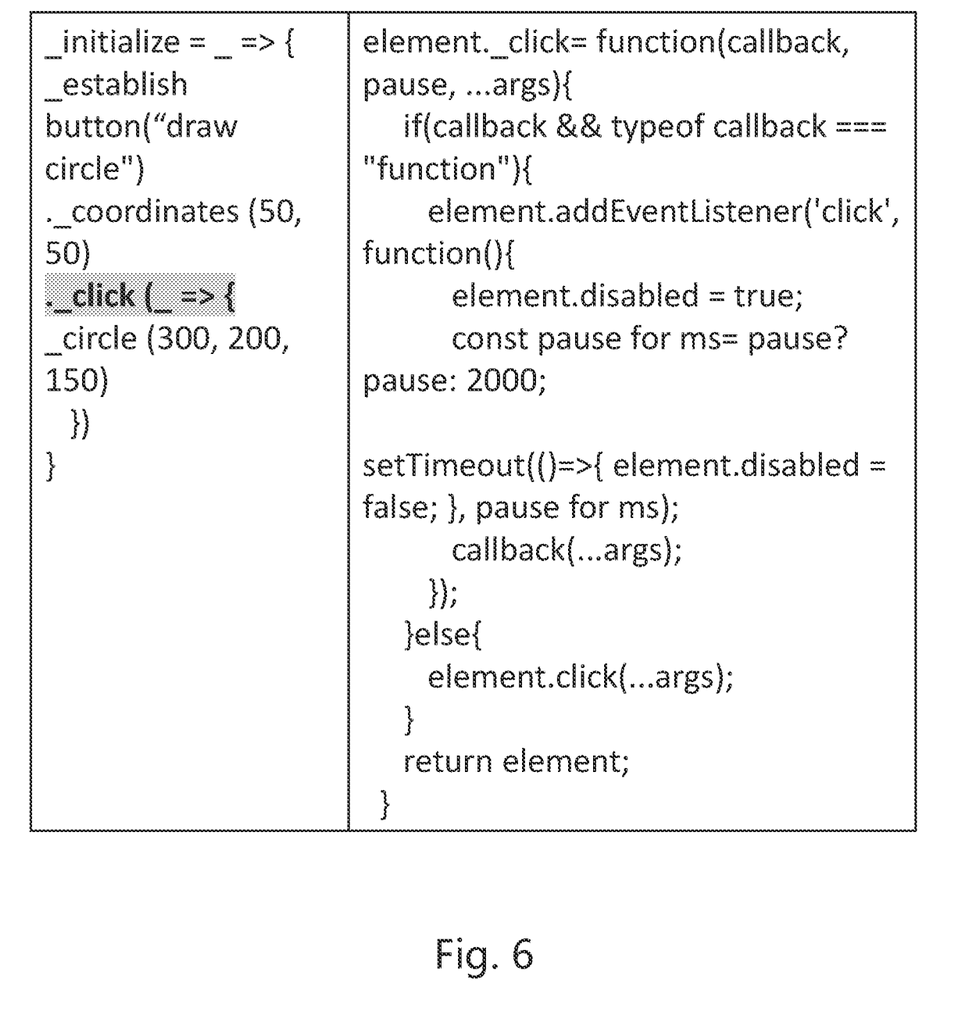
FIG. 6 shows the correlation of a webpage edition instruction set and transform functions according to yet another embodiment of the present invention.

Refer to FIGS. 4-6 for the corresponding relationship between the webpage edition instruction 200 and the syntax transform module 10 (i.e. the transform function of the transform application program). The webpage edition instruction set 20 is shown in the left columns of FIGS. 4-6. One of the webpage edition instructions 200 is highlighted with gray color in each left column. A portion of the contents of the program code of the transform function corresponding to the gray color-highlighted webpage edition instruction 200 is shown in the right column. It is seen: each of the webpage edition instructions 200 utilizes the combination of "_" or "._" and a natural language-based syntactic structure to correlate with one of the syntax transform modules 10. As shown in FIG. 4, the "_establish a button icon)" of the webpage edition instruction 200 is correlated with "function_establish button", and the succeeding "button name, class, nobody" is taken from the content description part. As the content description part is free of corresponding parameters, variables or values, such as class and nobody, but only has a name of the corresponding button: "draw circle", it is treated according to the syntactic rule of the JavaScript programming language. The "coordinates (50, 50)" in FIG. 5 and the "._click (=>{" in FIG. 6 also have identical or similar syntactic structures.

In summary, the transform application program uses the function instruction part to link with one of the transform functions. Thereby, while the edition unit 2 uses the transform application program to execute the webpage edition instruction set 20, the edition unit 2 uses the content of the function instruction part to acquire the corresponding transform function of the transform application program. Further, the contents of the content description part of each webpage edition instruction 200 is one or a combination of more than two of the parameters, variables and values, which the transform function that the function instruction part of the webpage edition instruction 200 needs to apply to the corresponding transform function.

In the present invention, the local function library for storing the transform functions is established in the webpage edition system. Alternatively, the webpage edition system is connected with a far-end function library established in a far-end data server for storing the transform functions.

Figure 7:
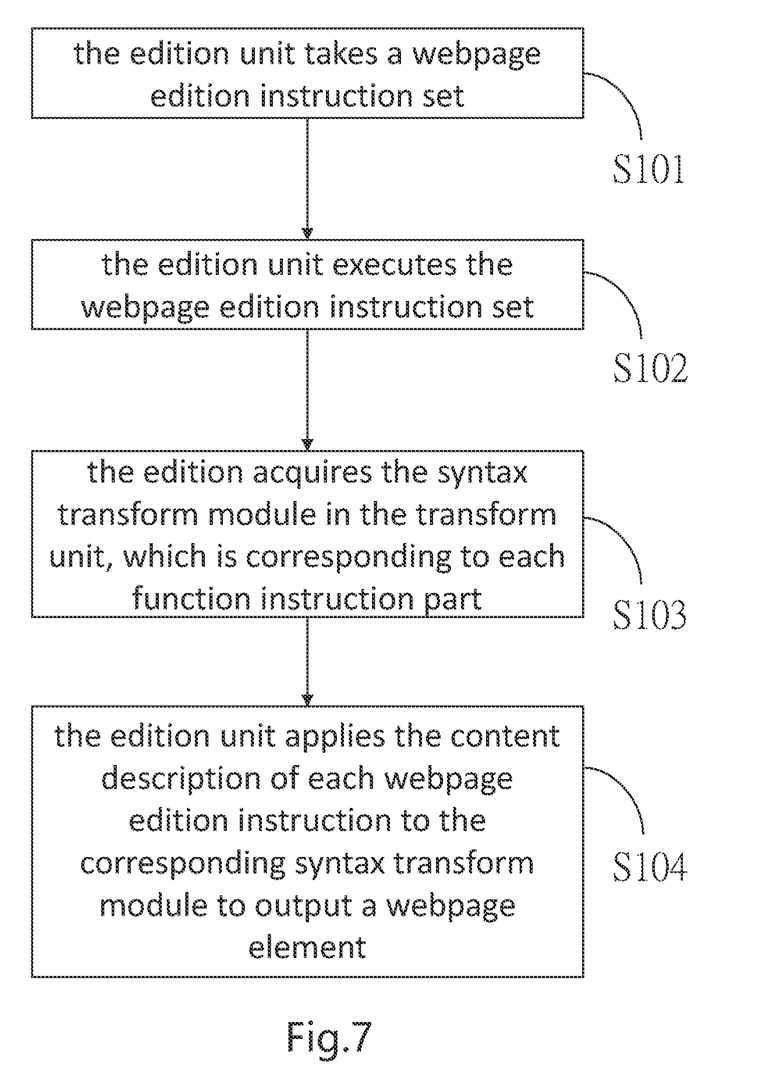
FIG. 7 shows a flowchart of a webpage edition method according to one embodiment of the present invention.

Refer to FIG. 7, which is a flowchart of a webpage edition method according to one embodiment of the present invention. The webpage edition method of the present invention is applied to a webpage edition system, which comprises a transform unit 1 and an edition unit 2. The transform unit 1 includes a plurality of syntax transform modules 10.

Each syntax transform module 10 is corresponding to a webpage edition instruction 200. Each webpage edition instruction 200 includes at least one of a function instruction part and a content description part. The function instruction part is edited with a natural language-based syntactic structure. The webpage edition method comprises Step S101: the edition unit 2 receives a webpage edition instruction set 20, wherein the webpage edition instruction set 20 is edited with one or more webpage edition instructions 200;

Step S102: the edition unit 2 executes the webpage edition instruction set 20, wherein the edition unit 2 analyzes the function instruction part and the content description part of each webpage edition instruction 200 of the webpage edition instruction set 20;

Step S103: the edition unit 2 acquires the syntax transform module 10 in the transform unit, which is corresponding to each function instruction part, according to the order of the webpage edition instructions 200; and Step S104: the edition unit 2 applies the content description part of each webpage edition instruction 200 to the corresponding syntax transform module 10 to output a webpage element.

In Step S104, each syntax transform module 10 is program codes edited in a programming language in advance according to the conversion relationship of each webpage edition instruction 200 being converted into a webpage element. In detail, each syntax transform module 10 transforms each webpage edition instruction 200 into a corresponding program code based on one or more than two of HTML, CSS, and JavaScript; then the webpage browser executes the program code based on one or more than two of HTML, CSS, and JavaScript and presents a corresponding webpage element.

Figure 8:
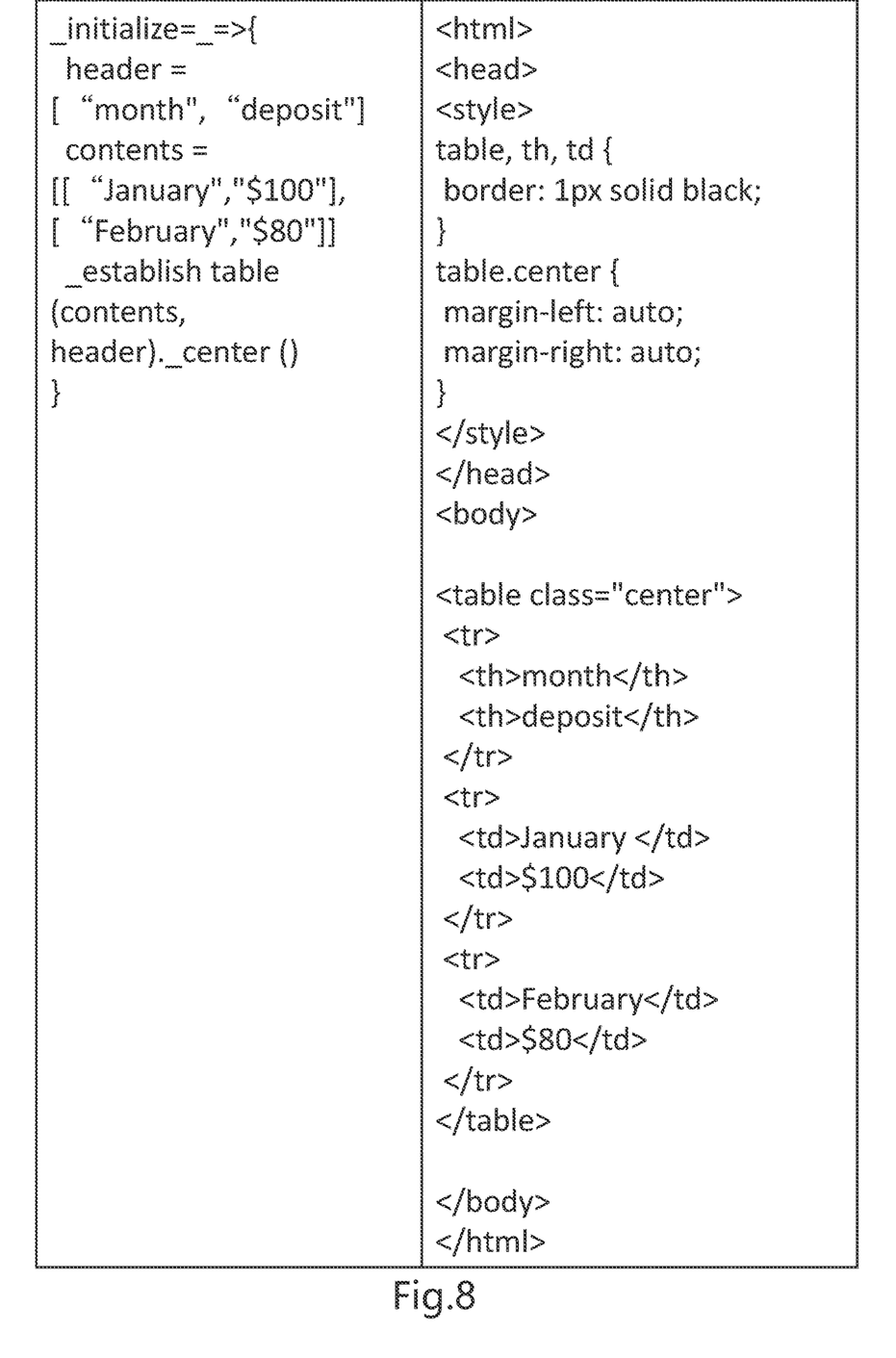
FIG. 8 shows the correlation of a webpage edition instruction set and a webpage source code according to one embodiment of the present invention.

The contents of the webpage edition instruction set 20 of the present invention is simpler and easier to understand, in comparison with the conventional webpage source codes directly edited with HTML, CSS, JavaScript, etc. Refer to FIG. 8. The webpage edition instruction set 20 is shown in the left column. The right column shows the webpage source code of the webpage edition instruction set 20 shown in the left column, which is edited with HTML, CSS, JavaScript, etc. The webpage edition instruction set 20 has 85 bytes. The webpage source code has 301 bytes. Therefore, the present invention can save about 72% of bytes. The webpage elements presented by the webpage edition instruction set 20 and the webpage source code in FIG. 8 are shown below.

| Month | Deposit |
|---|---|
| Jan | $100 |
| Feb | $80 |

Figure 9:
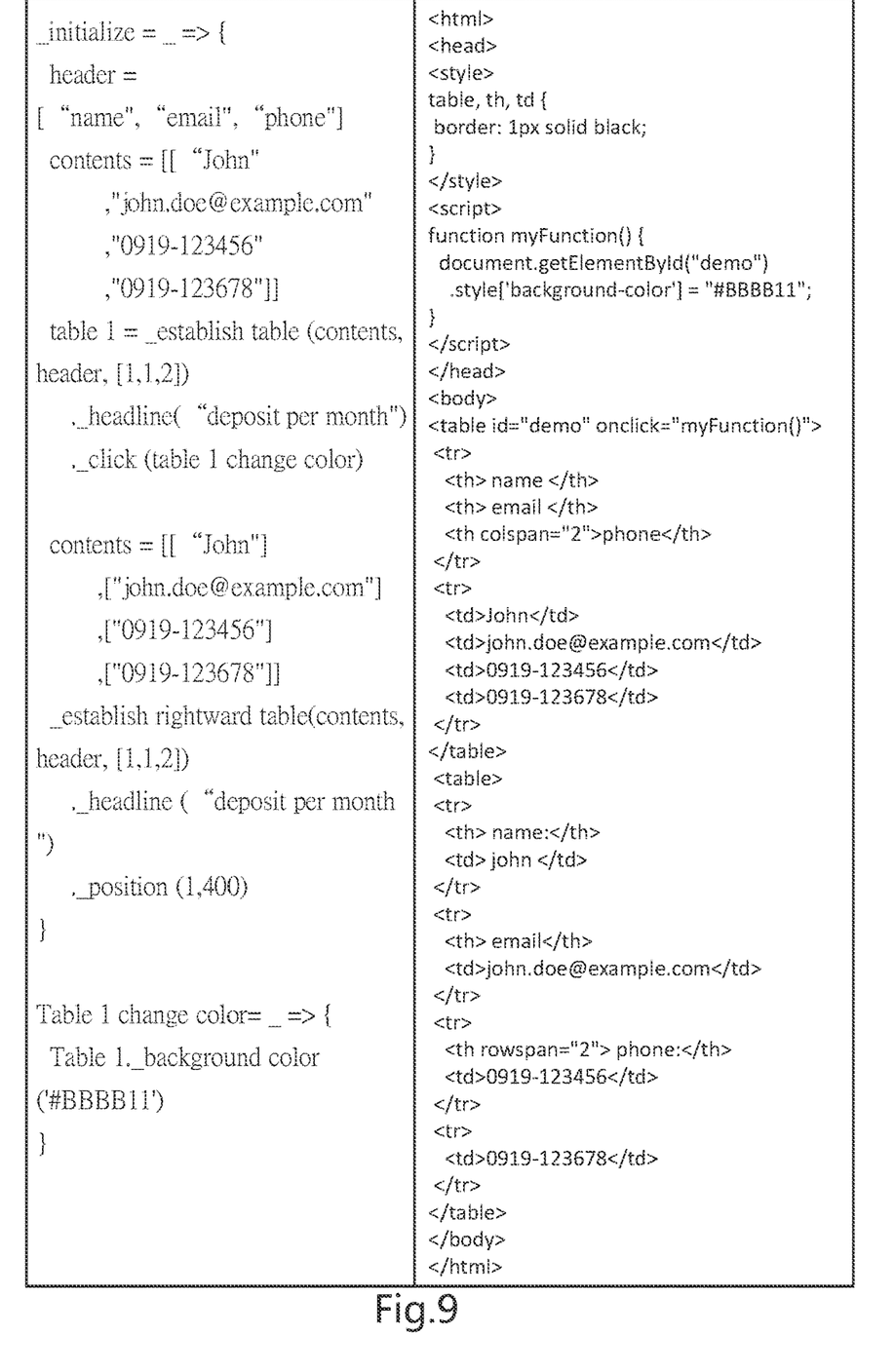
FIG. 9 shows the correlation of a webpage edition instruction set and a webpage source code according to another embodiment of the present invention.

Refer to FIG. 9. The webpage edition instruction set 20 is shown in the left column. The right column shows the webpage source code of the webpage edition instruction set 20 shown in the left column, which is edited with HTML, CSS, JavaScript, etc. The webpage edition instruction set 20 has 395 bytes. The webpage source code has 659 bytes. Therefore, the present invention can save about 40% of bytes. The webpage elements presented by the webpage edition instruction set 20 and the webpage source code in FIG. 9 are shown below.

| Name | Email | Phone |
|---|---|---|
| John | john.doe@example.com | 0919-123456  0919-123678 |

| | |
|---|---|
| Name: | John |
| Email | john.doe@example.com |
| Phone: | 0919-123456 |
| | 0919-123678 |

According to the above description, the edition unit 2 of the present invention utilizes the syntax transform module 10 to transform the webpage edition instruction set 20 into the webpage source code based on HTML, CSS, JavaScript, etc. The edition unit 2 performs edition and execution via installing the transform application program in the operating system of the computer. Alternatively, the edition unit 2 may perform edition and execution via linking the web browser to the edition webpage.

Besides, the webpage edition instruction set 20 of the present invention can be edited and amended more easily than the conventional webpage source codes directly edited with HTML, CSS, JavaScript, etc. Further, the present invention can fast find the contents to be amended. Furthermore, the bytes of the webpage edition instruction set 20 of the present invention are less than the bytes of the webpage source code. Therefore, the present invention can decrease the edition time.

The webpage source code of a commercial webpage edition software, such as the Dreamweaver, is complicated and hard to understand in comparison with the present invention. While the webpage code is further edited with a different commercial webpage edition software in the future, the problem of compatibility would happen. In comparison with the present invention, simplified programming languages for simplifying the webpage edition program code, such as jQuery, only simplify the syntax of JavaScript, involving neither HTML nor CSS. Therefore, the present invention can solve many problems of traditional commercial webpage edition software and simplified programming languages.

The embodiments described above are only to exemplify the present invention but not to limit the scope of the present invention. Any simple substitution or equivalent variation according to the contents of the specification and claims of the present invention is to be also included by the scope of the present invention.

What is claimed is:

1. A computer with a webpage edition system installed therein for editing and executing webpages, the webpage edition system comprising:
    a transform unit including a plurality of syntax transform modules, wherein each of the syntax transform modules is corresponding to a webpage edition instruction, and a portion of each webpage edition instruction is defined by a natural language-based syntactic structure, wherein each of the syntax transform modules is program code edited in a programming language in advance according to a conversion relationship of each webpage edition instruction being converted into the webpage element; and
    an edition unit configured to use at least one of the webpage edition instructions to form a webpage edition instruction set, wherein while the edition unit is executing the webpage edition instruction set, the edition unit takes the corresponding syntax transform module from the transform unit to convert each of the webpage edition instruction set into a webpage element, wherein the transform unit and the edition unit are edited in the programming language to form a transform application program, and the transform unit is edited in the transform application program according to the conversion relationship; the transform application program includes a plurality of transform functions; each of the transform functions is corresponding to one of the plurality of syntax transform modules; while the transform application program executes each of the webpage edition instructions, the transform application program uses at least one of the transform functions to generate the webpage element.

2. The computer with the webpage edition system installed therein according to claim 1, wherein the programming language is a Java programming language, a JavaScript programming language, a C programming language, a Rust programming language, a Go programming language, a WebAssembly programming language, a Python programming language, a Ruby programming language, a PHP programming language, or a C++ programming language.

3. The computer with the webpage edition system installed therein according to claim 1, wherein the webpage edition system further comprises a local function library for storing the plurality of transform functions or is connected with a far-end function library established in a far-end data server for storing the plurality of transform functions.

4. The computer with the webpage edition system installed therein according to claim 1, wherein the webpage element is realized by one of an HTML-based program code, a CSS-based program code, and a JavaScript-based program code, or a combination of more than two of an HTML-based program code, a CSS-based program code, and a JavaScript-based program code.

5. The computer with the webpage edition system installed therein according to claim 1, wherein each of the webpage edition instructions includes at least one of a function instruction part and a content description part; the function instruction part is edited with a natural language-based syntactic structure; the content description part contains at least one of a parameter, a variable, and a value.

6. The computer with the webpage edition system installed therein according to claim 3, wherein the function instruction part of each of the webpage edition instructions is corresponding to one of the plurality of syntax transform modules; while the edition unit is executing the webpage edition instruction set, the edition unit uses the function instruction part to acquire the corresponding syntax transform module;

the content description part of each of the webpage edition instructions includes at least one of a parameter, a variable, and a value that need to be applied to the corresponding syntax transform module for the function instruction part of the webpage edition instruction.

\* \* \* \* \*